United States Patent [19]
Gandrud

[11] 3,908,688
[45] Sept. 30, 1975

[54] SPEED ADJUSTMENT CONTROL FOR A FLUID MOTOR

[76] Inventor: Ebenhard S. Gandrud, P.O. Box 528, Owatonna, Minn. 55060

[22] Filed: June 8, 1973

[21] Appl. No.: 368,210

[52] U.S. Cl. ............... 137/110; 91/421; 137/115; 137/599.1; 417/307
[51] Int. Cl.² .............. F15B 13/042; G05D 7/00; G05D 16/00
[58] Field of Search ............ 91/421, 437, 463, 462, 91/465, DIG. 2; 137/115, 116, 117, 110, 599.1; 417/307

[56] References Cited
UNITED STATES PATENTS

| | | | |
|---|---|---|---|
| 2,416,933 | 3/1947 | Lynam et al. | 91/DIG. 2 |
| 2,608,986 | 9/1952 | Stephens | 91/421 X |
| 2,656,846 | 10/1953 | Anderson | 137/115 |
| 2,789,576 | 4/1957 | Mitchell | 137/117 X |
| 2,791,229 | 5/1957 | Pasco | 137/117 |
| 3,127,817 | 4/1964 | Duner | 91/437 X |
| 3,584,540 | 6/1971 | Petersen et al. | 91/468 |

FOREIGN PATENTS OR APPLICATIONS 1,142,737  1/1963  Germany .............. 91/463

Primary Examiner—Irwin C. Cohen
Attorney, Agent, or Firm—Merchant, Gould, Smith & Edell

[57] ABSTRACT

A valve body adapted for mounting on a fluid pressure operated motor and having inlet and outlet passages for connection to inlet and discharge openings respectively of the motor, the inlet and outlet passages terminating in ports for connection to fluid pressure and return lines respectively. A metering valve element in the outlet passage is operable to vary the flow of fluid from the motor and cause a variation in pressure of fluid in the inlet passage. A shunt valve element in a shunt passage communicating with the inlet passage is operable to cause fluid to bypass the fluid motor in varying quantities.

3 Claims, 6 Drawing Figures

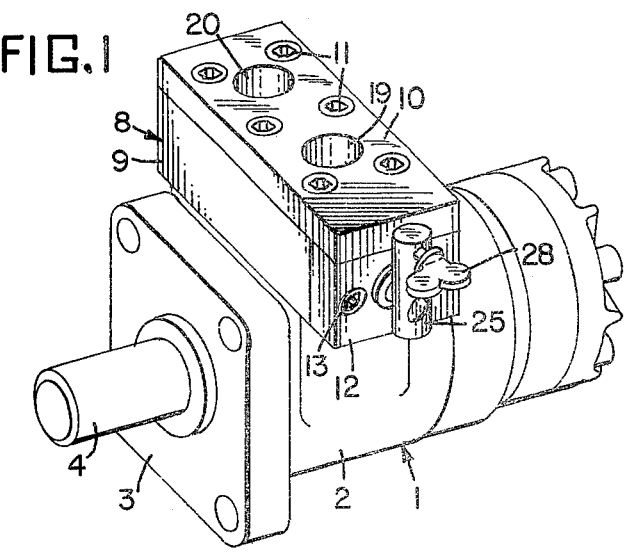
FIG. 1
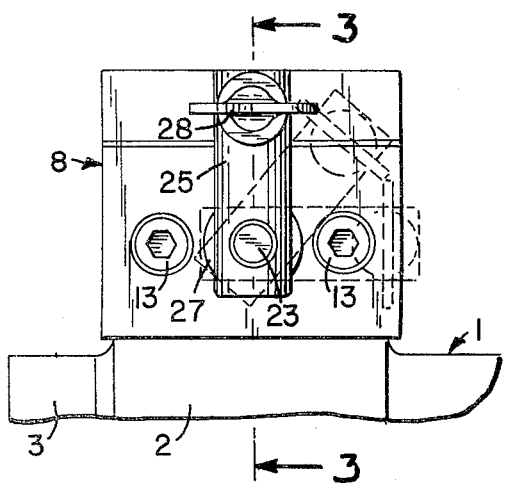
FIG. 2
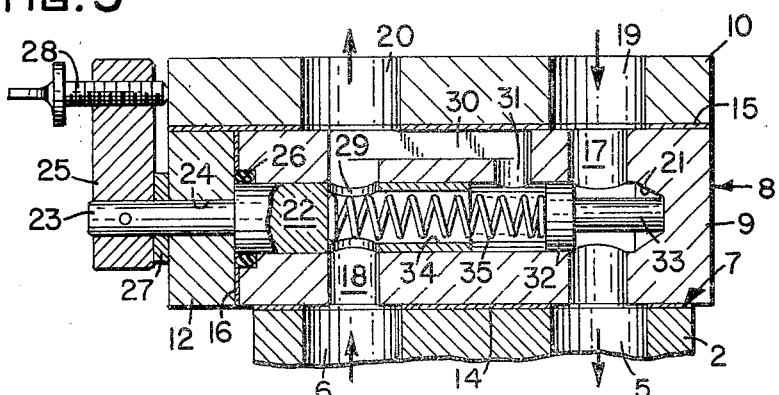
FIG. 3
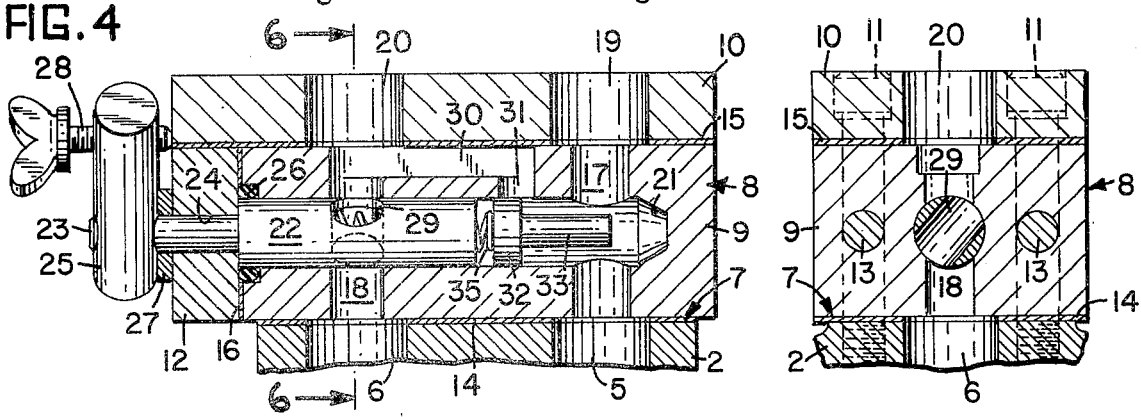
FIG. 4
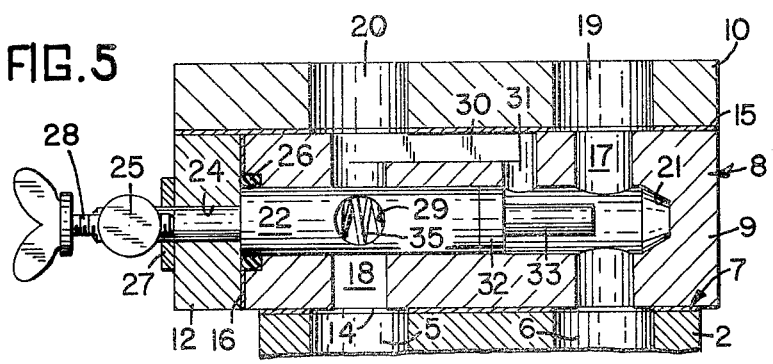
FIG. 5
FIG. 6

3,908,688

SPEED ADJUSTMENT CONTROL FOR A FLUID MOTOR

BACKGROUND OF THE INVENTION

This invention relates generally to the control of fluid pressure operated devices, and more particularly to the control of speed of rotary fluid pressure operated motors. The use of a metering valve in a fluid supply conduit between the discharge port of a pump and the inlet of a motor is known, as is the use of the bypass or pressure relief valve in such a supply conduit. In many instances, the fluid motor is remote from the pressure source, the relief valve and bypass usually being disposed in close relation to the source.

The metering valve, being disposed in the supply conduit, is at all times subject to the full pressure of the pump and a good deal of heat is generated in the valve and the valve is subject to considerable wear due to friction of the fluid therein, with consequent early replacement or repair required.

Moreover, in order to have the control valve in the supply line close to the motor, as is desirable in many cases, a bypass return conduit to the source must be provided, resulting in the use of an excessive amount of conduit.

SUMMARY OF THE INVENTION

An important object of this invention is the provision of a speed adjustment control device for fluid motors which can be used at points remote from a source of fluid under pressure, and which eliminates the necessity for a separate bypass conduit in addition to the usual return hose or pipe, to a fluid reservoir.

Another object of this invention is the provision of a speed control device which can be mounted on a motor and which will occupy a minimum space.

Still another object of this invention is the provision of a speed control device in which a metering valve and a bypass valve are disposed in a common compact housing, which involves a minimum number of moving parts, and which will operate at a relatively cool temperature.

To the above ends, I provide a valve body having spaced inlet and outlet passages therein for connection to inlet and outlet openings respectively, of a fluid pressure operated motor, the body defining an inlet port to the inlet passage for connection to a pump, and an outlet port to the outlet passage for connection to a return conduit to a source of fluid. A metering valve is mounted in the body and is operative to provide a variable restriction in the outlet passage. The body has a shunt passage therein extending from the inlet passage to the outlet passage between the metering valve and the outlet port. A shunt valve in the shunt passage is normally closed by spring bias when the metering valve is wide open and the motor running at full speed. Movement imparted to the metering valve element toward a valve closed position causes pressure to rise in the motor and in the inlet passage above that required for normal operation of the motor. This increase in pressure opens the shunt valve so that some fluid is bypassed through the shunt passage to the outlet port and return conduit. The balance of fluid, passing through the motor, operates the same at a reduced rate of speed.

DESCRIPTION OF THE DRAWINGS

FIG. 1 is a view in perspective of a fluid operated rotary motor with the speed adjustment control device of this invention mounted thereon;

FIG. 2 is an enlarged fragmentary view in end elevation of the speed control device;

FIG. 3 is a vertical section taken substantially on the line 3—3 of FIG. 2, some parts being broken away;

FIGS. 4 and 5 are views corresponding to FIG. 3 but showing different positions of some of the parts; and FIG. 6 is a fragmentary section taken on the line 6—6 of FIG. 4.

DETAILED DESCRIPTION OF THE PREFERRED EMBODIMENT

In FIG. 1, a rotary fluid pressure operated motor is indicated generally at 1, the same having a casing 2 formed with a mounting flange 3 from which projects a rotary drive shaft 4. The motor 1, in and of itself, does not comprise the instant invention, and may be of any well-known commercially available types, an example of which is disclosed in U.S. Letters Patent No. 3,233,524. It should suffice to state that the casing 2 is provided with spaced apart fluid inlet and outlet openings 5 and 6 respectively, these opening through a flat mounting surface 7 on the casing 2.

The speed adjustment control device of this invention includes a rectangular body indicated generally at 8, the body 8 comprising a main body member 9, a top cap member 10 secured to the body member 9 by machine screws or the like 11 and an end cap member 12 secured to the main body member 9 by screws or the like 13. As shown by dotted lines in FIG. 6, the machine screws 11 extend through the main body member 9 and operate to secure the body 8 to the motor casing 2. When the body 8 is secured to the motor casing 2, a gasket 14 is interposed between the main body member 9 and casing 2, other gaskets 15 and 16 being interposed between the main body member 9 and top and end cap members 10 and 12 respectively.

The valve body 8 defines a pair of laterally spaced parallel inlet and outlet passages 17 and 18 respectively, each having one end in communication with a respective one of the inlet and outlet openings 5 and 6. The opposite ends of the inlet and outlet passages 17 and 18 communicate with respective high pressure inlet and low pressure outlet ports 19 and 20 in the top cap member 10, the ports 19 and 20 being screw threaded for reception of commercially available conduit fittings, not shown, but by means of which the inlet port 19 may be connected to a fluid pump, not shown, and whereby the outlet port 20 may be connected to a low pressure return line or conduit to a fluid reservoir not shown.

The main body member 9 is longitudinally bored to provide a cylindrical recess 21 that extends longitudinally of the main body member 9 from the end cap member 10 and intersecting the inlet and passages 17 and 18, the recess 21 terminating in inwardly spaced relation to the right hand end of the main body member 9 with respect to FIGS. 3–5. A cylindrical metering valve element 22 is rotatably mounted in the cylindrical recess 21, and extends inwardly thereof from the end cap member 12 and through the intersection of the outlet passage 18 and recess 21, as shown in FIGS. 3–5. At its outer end, the metering valve element 22 is provided with a diametrically reduced shaft 23 that extends outwardly through an opening 24 in the end cap member 12, the outer end of the shaft 23 being pinned or otherwise rigidly secured to the inner end portion of a radially projecting handle member 25 which is utilized to rotate the shaft 23 and valve element 22. Adjacent the end cap member 12, the main body member 9 is counterbored to receive a sealing ring in the nature of a commercially available O-ring 26, and a washer 27 is interposed between the end cap member 12 and the handle member 25. Adjacent its radially outer end, the handle member 25 is provided with a transverse locking screw 28 the inner end of which is adapted to selectively engage the adjacent end of the top cap member 10 or the end cap member 11 to frictionally lock the metering valve element 22 against rotation in the recess 21. The metering valve element 22 has a passage 29 extending diametrically therethrough, the passage 29 being movable between a fully open position in axial alignment with the outlet passage 18 and a fully closed position, wherein the axis of the passage 29 is normal to the axis of the outlet passage 18, see particularly FIGS. 3–5. As shown, the passage 29 is of substantially the same diameter as the outlet passage 18.

The valve body 8 is formed to provide a shunt passage that includes a portion of the recess 21 between the inner end thereof and the metering valve element 22, a passage portion 30 communicating with the outlet passage 18 intermediate the metering valve element 22 and the outlet port 20, and a connecting passage portion 31 which connects the passage portion 30 with the recess 21, intermediate the inner end of the metering valve element 22 and the inlet passage 17, see FIGS. 3–5. A piston-like shunt valve element 32 is axially slidably mounted in the cylindrical recess 21, and is formed to provide an axial stem 33 that engages the inner end of the recess 21 to limit movement of the shunt valve element 32 in one direction. As shown in FIG. 3, the metering valve element 22 is axially bored to provide a recess 34 for reception of one end portion of a coil compression spring 35, the opposite end of which engages the shunt valve element 32 to yieldingly urge the shunt valve element 32 toward the closed end of the recess 21. It will be noted that, when the stem 33 is bottomed in the recess 21, the shunt valve element 32 is disposed adjacent the inlet passage 17 and the shunt passage portion 31 is disposed intermediate the shunt valve element 32 and the inner end of the metering valve element 22. The shunt passage portion 31 is so arranged that, when the shunt valve element 32 is moved into engagement with the adjacent end of the metering valve element 22, the shunt passage portion 31 is in full communication with the inlet passage 17, as shown in FIG. 5.

OPERATION

The spring 35 is designed to exert such pressure on the shunt valve element 32 that will maintain the valve element 32 in its valve closed position of FIG. 3 under full working pressure of a given fluid motor 1. Thus, when the metering valve element 22 is in its full open position of FIG. 3, the shunt valve element 32 will remain in its position of FIG. 3 with the valve stem 33 bottomed in the recess 21. When the metering valve element 22 is rotated to a partially closed position, as shown in FIGS. 4 and 6, the restriction set up by the metering valve element 22 in the outlet passage 18 results in a decrease of fluid flow through the passage 18 and a corresponding increase in fluid pressure in the motor 1 and inlet passage 17 sufficient to move the shunt valve 32 against bias of the spring 35 to a point where the shunt passage portion 31 is partially exposed to the inlet passage 17, permitting a portion of the fluid in the inlet passage 17 to be discharged through the shunt passage portions 31 and 30 to the outlet passage 18 adjacent the outlet port 20. Thus, the shaft 4 of the motor 1 will be caused to rotate at a slower speed than maximum. When the metering valve element 22 is rotated to its fully closed position of FIG. 5, the resultant stoppage of fluid flow through the motor and increase of pressure of fluid in the inlet passage 17 will cause the shunt valve element 32 to move against bias of the spring 35 toward the adjacent end of the mounting valve element 22 until the shunt passage portion 31 is fully exposed to the inlet passage 17. When this occurs, all of the fluid delivered to the inlet passage 17 will flow through the shunt passage forming portion of the recess 21, and passage portions 31 and 30 to the discharge port 20, and from thence return to the reservoir. There being no flow of fluid through the motor 1, rotation of the motor shaft 4 will cease. The rotary metering valve element 22 is locked in any adjusted position of rotary movement thereof by engagement of the locking screw 28 with the adjacent end of the top cap member 10 or adjacent surface of the end cap member 12.

It will be appreciated that, by placing the metering valve element 22 in the outlet or discharge passage 18, and the shunt valve element 32 in communication with the inlet passage 17, the metering valve element 22 is subject to a reduced pressure in passage restricting positions thereof than if the metering valve were placed in the inlet passage or in the inlet conduit. Thus, a reduction in heat in the metering valve element 22 is achieved. By having the metering valve element 22 and shunt valve element 32 in the same recess 21, the speed control device of this invention can be made in extremely compact and simple form, the same being easy and inexpensive to manufacture. Further, the use of the above-described speed control device obviates the necessity for variable speed or variable displacement pumps, while achieving a relatively fine degree of speed control of the fluid motor 1.

While I have shown and described a commercial embodiment of my speed adjustment control device, it will be understood that the same is capable of modification without departure from the spirit and scope of the invention, as defined in the claims.

What is claimed is:

1. A speed adjustment control device for fluid motors, said device comprising:
 a. a valve body defining laterally spaced inlet and outlet passages adapted to be connected at one end to high pressure inlet and low pressure outlet openings respectively of a fluid pressure operated motor;
 b. said body defining inlet and outlet ports to the other ends of said inlet and outlet passages respectively, said inlet port being adapted to be connected to a source of fluid under pressure;
 c. a cylindrical recess in said body intersecting said inlet and outlet passages intermediate the ends of said passages;
 d. a cylindrical metering valve element rotatively mounted in said recess coaxially therewith and having a transverse opening therethrough movable circumferentially into and out of register with said outlet passage to variably restrict flow of fluid through said outlet passage responsive to rotation of the metering valve element, said metering valve element having an inner end disposed between said inlet and outlet passages;

e. means for imparting rotary movement to said metering valve element;

f. said body further defining shunt passage means communicating at one end with said inlet passage and at its other end with said outlet passage intermediate said metering valve element and said outlet port, said shunt passage means including a portion of said recess between said inner end of the metering valve element and said inlet passage;

g. a shunt valve element disposed in said recess portion of the shunt passage for movements axially of said recess portion between valve closed and various valve open positions in said shunt passage means to control shunt flow of fluid therethrough;

h. said metering valve element defining an axial pocket connected to said transverse opening and opening toward said shunt valve element;

i. and a compression spring having one end disposed in said pocket and an opposite end engaging said shunt valve element and yieldingly urging said shunt valve element toward said valve closed position thereof.

2. The speed adjustment control device defined in claim 1, characterized by means in said recess portion for limiting spring imparted movement of said shunt valve element toward its shunt valve closed position, said inner end of the metering valve element engaging said shunt valve element to limit movement of the shunt valve element in a shunt valve opening direction against bias of said spring.

3. The speed adjustment control device defined in claim 2 in which said shunt valve element comprises a piston, said means for limiting spring imparted movement of the shunt valve element comprising an axial stem on said piston positioned to engage the bottom of said recess adjacent said inlet passage.

* * * * *